Feb. 1, 1966   J. D. BERING   3,232,313
BALANCED VALVES

Original Filed July 13, 1960   2 Sheets-Sheet 1

INVENTOR
JORGEN DIETZ BERING

Feb. 1, 1966 J. D. BERING 3,232,313
BALANCED VALVES

Original Filed July 13, 1960 2 Sheets-Sheet 2

United States Patent Office 3,232,313
Patented Feb. 1, 1966

3,232,313
BALANCED VALVES
Jorgen D. Bering, % Q-Controls, Occidental, Calif.
Original application July 13, 1960, Ser. No. 42,641, now Patent No. 3,121,444, dated Feb. 8, 1964. Divided and this application Nov. 8, 1963, Ser. No. 322,561
1 Claim. (Cl. 137—450)

This invention relates to a new and useful improvement in balanced valves used in the control of liquid flow and is a division of co-pending application Serial No. 42,641, filed July 13, 1960, now Patent No. 3,121,444, for Balanced Valves. The operation of such valves is at times exposed to disturbances caused by the line pressure of the liquid. It is the object of my invention to provide efficient valves resistant to disturbances of this nature. It is furthermore the object of my invention to provide design for such disturbance resistant valves that can be made in stainless steel and used in sanitary and corrosive-resistant operation when open flow, complete drainage, ready assembly and absence of cavities are factors of importance.

More specifically, my invention relates to the type of liquid valves that consist of a housing, comprising a chamber with intake and outlet ports, and a stem comprising a plate capable of covering one of the ports in a liquid tight manner, and means for moving the plate—by the "operation" of the valve—away from the port (opening the valve) or to cover the port in a liquid tight manner (closing the valve). The liquid tight closure is usually obtained by perimetrical juxtaposition as the edge of the stem plate forms sealing contact with the housing port in what is termed the "seating" of the valve.

The work load on the means for operating valves of this type consists of the mechanical load of moving the stem plate in and out of closing position; exerting sufficient pressure, when needed, on the stem plate in closed position to make proper sealing; and overcoming the effects of the line pressure and the kinetic action of the liquid flow upon the stem movement. In many cases there are suitable means for the operation of the valve—such as turning, threaded or leverage arrangements—that are capable of dealing adequately with these functions. But there are usages of valves in which the available means for operation do not properly curb the effects of the line pressure. Disturbing effects upon the action of the valve may result.

These disturbances tend to occur when the valve is moved back or forth through near-closing ("cracked") to closed position. If the direction of the liquid flow is parallel with that of the stem movement toward closing position there is a tendency to a final jolting closure that may shake the line or damage the seat. The opening of the valve, performed against the larger static pressure on the intake side of the valve, may require a substantial initial pull and cause a jolting opening action. The final closing of the valve may also become affected by kinetic action of the liquid flow, augmented by the increase in velocity as the orifice is being restricted toward the closure of the valve. The result is often an oscillating and clattering effect which on occasion may block the closure of the valve altogether. When the direction of the liquid flow runs counter to the stem action the tendency to kinetic disturbances is increased, and accidental opening of the valve by excessive static line pressure (which now operates against proper closure) becomes an operational hazard.

Among the types of valve operation that are particularly vulnerable to line pressure disturbances of this nature are: Straight-line stem activation, as often required in "automated" operation; float valves operating in restricted space when only limited power for stem activation is available; regulating valves that tend to be operated in "cracked" or nearly-closed position; sanitary or corrosive-resistant operation when only special valve design becomes acceptable; and generally in valves that are made of stainless steel.

The extreme sensitivity of stainless steel valves (or valves of seating and sealing parts in stainless steel) to line pressure disturbance seems related to the unique surface character of this material which includes the so-called "galling" effect, or resistance to mobile area contact between parts made of this material. Any unbalanced or jolting valve action which invites violent area contact between stem and housing will tend to cause sticking of the valve and severe damage to the contacting surfaces. Once brought into a "cocked," or locked-unaligned position by jolting action, a valve in stainless steel will tend to "grab" or remain locked and exposed to cutting action. A phase of my invention is specifically concerned with the elimination of jolting action from line pressure disturbances and damage of this source to valves of stainless steel.

For the purpose of eliminating these disturbing pressure effects my invention provides a novel valve design in which the valve stem acts simultaneously on two or more outlet ports in the valve housing of equal orifice and oppositely directed in relation to the movement of the valve stem, causing an equalization and elimination of the effects of the inlet pressure and, when required, of the outlet pressure as well upon the operation of the valve.

Other features of valves incorporating the design of my invention are open flow, absence of pockets, complete drainage, and a simplicity in structure that lends itself to execution in stainless steel and usage in sanitary and corrosive resistant operation.

I have also found that the design of the means for seating and sealing within the various orifices is of importance for the smooth performance of valves balanced in this manner, especially when made in stainless steel. As shown in the drawings, my invention includes a housing structure comprising a seating port and one or two more cylindrical outlet ports, and a stem structure comprising a seating end and two or more cylindrical sections with packing rings for mobile sealing within the cylindrical ports of the housing.

For smooth action and effective closure, and especially in view of the hazards related to stainless steel area contact, my invention comprises these specifications for the seating and sealing means; the seating should be obtained by a spherical stem section rendering line contact with a seating port in the housing which includes a cone section of an angle of not over 60 degrees with the axis of the seating port; in case of the means for mobile sealing the diametrical clearance between the cylindrical stem section and the bore of the cylindrical housing port should be no less than .010″.

As mentioned, my invention is of particular importance in case of certain types of valve operation, but its significance is not limited to them. In general, the elimination of the line pressure effect upon the operation with the related means for seating and sealing and the resulting simplification in construction make possible novel and effective valve designs for various purposes, as demonstrated in the FIGS. 1 to 4.

The disturbing effects of line pressure upon valve operation tends to come from three sources, namely, (1) the incoming line pressure; (2) the line pressure on the discharge side referred to as the back pressure; and (3) the liquid pressure of the interior of the valve as it affects the stem when it connects with a rod through an orifice with the exterior of the valve and here referred to as the stem rod effect.

For complete elimination of the effects of line pressure on the operation of the valve, all of these three categories must be covered. However, the stem rod effect or the back pressure is frequently minor or nil, and in that case there may be little or no need for the elimination of their effect. My invention therefore includes its embodiment both in designs of complete elimination of line pressure effect and in designs of greater simplicity without means for the elimination of the stem rod effect, or the back pressure effect, or both.

Other objects of the present invention will become apparent upon reading the following specification and referring to the accompanying drawings in which similar characters of reference represent corresponding parts in each of the several views.

Figure 2:
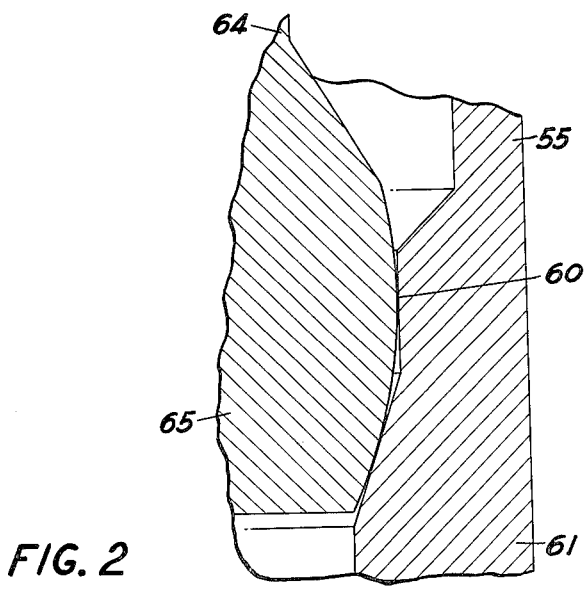
FIG. 2 is an enlarged fragmentary sectional view of the seating portion of the valve of FIG. 1.

The valve shown in the drawings may be made in any suitable metal or plastic product resistant to the materials to which it may be exposed. In metal, stainless steel is often preferable, at least for the seating and mobile sealing sections, and in this case, as already mentioned, the following specifications are part of my invention: The seating should be performed in linear fashion by means of a spherical stem part and a matching seating port comprising a conical section of an angle of no more than 60 degrees with the gear of the port, as shown in detail in FIG. 2. As to the cylindrical mobile sealing with packing ring the diametrical clearance between the cylindrical stem section and the bore of the housing port should be no less than .010" to assure smooth closure without tendency for binding and damage to the seating and moving parts.

Any suitable packing may be used such as O-rings, commerically available torus-shaped rings in plastic material, usually rubber. Mobile sealing is obtained by placing the O-ring in a stem groove which by its depth provides a slight squeeze on the O-ring against the bore of the housing cylinder.

Figure 1:
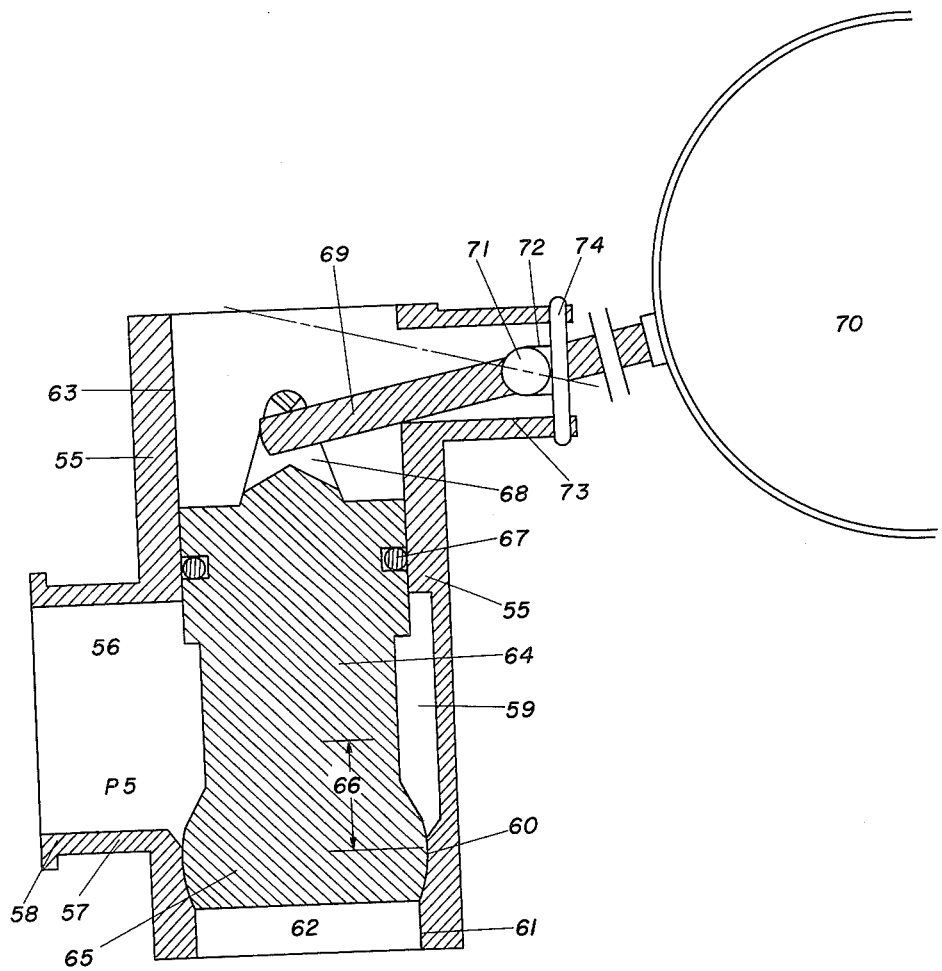
FIG. 1 shows an L-flow valve embodying the structure of my invention and designed for usage as a float valve for open discharge with no back pressure effect.

FIG. 1 shows a highly efficient and smoothly operating L-flow float valve of extremely simple design, particularly well-suited for execution in stainless steel and for sanitary or corrosive-resistant operation.

The housing is shown as 55, with side inlet port 56, and inlet tubing 57 ending in union part 58 for connection with intake line of hydrostatic pressure P5. The center section 59 of enlarged orifice to permit liquid passage around the stem 64 leads downwardly (the valve being held in vertical position) to the seating port 60 with discharge tubing 61 and open discharge at 62. The upper cylindrical section of the housing is 63. The stem plug 64 has a lower seating end 65, and an upper sealing end containing the packing ring 67.

On top of the stem plug 64 is the eyelet for loose coupling with the float rod 69 which carries the float 70 and goes through the hub 71 which turns in the slot 72 of the tubular protrusions 73 on the side of the housing 55 and held in place by the lock ring 74.

By elimination of the effect of the line pressure (P5) on the stem action—by exerting equal and oppositely directed pressures in closed position on the identical orifices of the seating port 60 and the housing section 63 and against the identical outside conditions of atmospheric pressure—the valve operation is reduced to the mechanical action of gravitational lifting and dropping of the stem plug 64 over the stroke 66 of the valve. This action is performed smoothly and effectively at all usual line pressures by gravitational leverage. The length of the float rod 69 and the weight and volume of the hollow float 70 is dimensioned so that in air the weight of the float will by leverage lift the stem plug 64 in the housing 55. As the liquid rises in the tank in which the valve is installed the weight of the float is eliminated by its buoyancy and the stem sinks by its weight in the housing into closed position of the valve. Further rise in liquid level of the tank, with further submersion of the float and increased buoyance augmented by leverage, may produce a substantial pressure of the stem plug 65 against the seating port 60 and assure firm closure of the valve against substantial hydrostatic line pressure.

The stroke 66, or the movement of the stem plug 64 within the housing 55 between closed and open position of the valve, may be performed by various other means than the float arrangement just described, and in general the valve may be used as an open discharge drain valve. It is, however, when this design is used as a float valve that its various novel features are found particularly appropriate.

Although the foregoing invention has been described in some detail, by way of illustration and example for purposes of clarity of understanding, it is understood that certain changes and modifications may be practiced within the spirit of the invention and scope of the appended claim.

What is claimed is:

A balanced valve comprising a body having a longitudinal central chamber formed with a first cylindrical bore, an annular seat of substantially the same area as the cross-section of said first bore and aligned therewith spaced downstream from said first bore, an enlarged center section between said first bore and said seat, an inlet port communicating with said center section and an outlet port downstream of said seat; a stem longitudinally reciprocable in said chamber formed with a cylindrical portion at its first end in sealing engagement with said first bore and a seating section on the downstream end of said stem cooperating with said seat when said stem is in closed position to close said valve; and means for reciprocating said stem in said chamber between closed position in which said seating section engages said seat to close said valve and open position in which said seating section is remote from said seat; said seating section formed as a downstream converging cone and said seat spheroidal, said seat and seating section formed of stainless steel, said center section of extended axial length to provide continuous communication between said inlet port and both said cylindrical section of said stem and said seating section in all positions of said valve, inlet pressure at said inlet port balacing said valve in closed position by acting on said stem in an upstream direction against said cylindrical portion and in a downstream direction against said seating portion, said first bore and said outlet port being in communication with each other externally of said body.

References Cited by the Examiner

UNITED STATES PATENTS

| | | | |
|---|---|---|---|
| 430,089 | 6/1890 | Sewall | 251—282 XR |
| 488,370 | 12/1892 | Schenck | 137—536 XR |
| 1,629,496 | 5/1927 | Fraser | 251—321 XR |
| 2,141,018 | 12/1938 | Ring | 251—281 |
| 2,636,517 | 4/1953 | Ferguson | 251—325 XR |
| 2,645,452 | 7/1953 | Lucas et al. | 251—368 XR |
| 2,715,415 | 8/1955 | Tucker | 137—450 XR |
| 2,752,947 | 7/1956 | Hruska | 251—282 XR |
| 2,755,817 | 7/1956 | Barr | 137—536 |

FOREIGN PATENTS 459,662  1/1937  Great Britain.

MARTIN P. SCHWADRON, *Acting Primary Examiner.*

WILLLIAM F. O'DEA, *Examiner.*